(12) United States Patent
Ding et al.

(10) Patent No.: US 10,713,532 B2
(45) Date of Patent: Jul. 14, 2020

(54) IMAGE RECOGNITION METHOD AND APPARATUS

(71) Applicant: TENCENT TECHNOLOGY (SHENZHEN) COMPANY LIMITED, Shenzhen (CN)

(72) Inventors: Shouhong Ding, Shenzhen (CN); Jilin Li, Shenzhen (CN); Chengjie Wang, Shenzhen (CN); Feiyue Huang, Shenzhen (CN); Yongjian Wu, Shenzhen (CN); Guofu Tan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 187 days.

(21) Appl. No.: 15/925,028

(22) Filed: Mar. 19, 2018

(65) Prior Publication Data

US 2018/0204094 A1 Jul. 19, 2018

Related U.S. Application Data

(63) Continuation of application No. PCT/CN2016/084418, filed on Jun. 2, 2016.

(30) Foreign Application Priority Data

Nov. 26, 2015 (CN) .......................... 2015 1 0843973

(51) Int. Cl.
*G06K 9/62* (2006.01)
*G06K 9/00* (2006.01)
*G06K 9/46* (2006.01)

(52) U.S. Cl.
CPC ....... *G06K 9/6256* (2013.01); *G06K 9/00248* (2013.01); *G06K 9/00268* (2013.01);
(Continued)

(58) Field of Classification Search
CPC ............. G06K 9/6256; G06K 9/00281; G06K 9/6247; G06K 9/6278; G06K 9/00288;
(Continued)

(56) References Cited

U.S. PATENT DOCUMENTS

2009/0067730 A1 3/2009 Schneiderman
2010/0329517 A1 12/2010 Zhang et al.
(Continued)

FOREIGN PATENT DOCUMENTS

| CN | 102004924 A | 4/2011 |
| CN | 104573652 A | 4/2015 |

(Continued)

OTHER PUBLICATIONS

The World Intellectual Property Organization (WIPO) International Search Report for PCT/CN2016/084418 dated Aug. 26, 2016 8 Pages (including translation).
(Continued)

*Primary Examiner* — Amandeep Saini
(74) *Attorney, Agent, or Firm* — Anova Law Group, PLLC (57) ABSTRACT

The present disclosure discloses an image recognition method and apparatus, and belongs to the field of computer technologies. The method includes: extracting a local binary pattern (LBP) feature vector of a target image; calculating a high-dimensional feature vector of the target image according to the LBP feature vector; obtaining a training matrix, the training matrix being a matrix obtained by training images in an image library by using a joint Bayesian algorithm; and recognizing the target image according to the high-dimensional feature vector of the target image and the training matrix. The image recognition method and apparatus according to the present disclosure may combine LBP algorithm with a joint Bayesian algorithm to perform rec-
(Continued)

ognition, thereby improving the accuracy of image recognition.

17 Claims, 7 Drawing Sheets

(52) U.S. Cl.
CPC ..... *G06K 9/00281* (2013.01); *G06K 9/00288* (2013.01); *G06K 9/6247* (2013.01); *G06K 9/6278* (2013.01); *G06K 2009/4666* (2013.01)

(58) Field of Classification Search
CPC ........... G06K 9/00268; G06K 9/00248; G06K 2009/4666
USPC ........................................................ 382/118
See application file for complete search history.

(56) References Cited

U.S. PATENT DOCUMENTS

| | | | | |
|---|---|---|---|---|
| 2015/0235073 | A1* | 8/2015 | Hua | G06K 9/00288 382/118 |
| 2016/0086047 | A1* | 3/2016 | Suh | G06K 9/6247 382/159 |
| 2016/0173560 | A1* | 6/2016 | Datta | H04L 67/02 709/203 |
| 2017/0300744 | A1* | 10/2017 | Ju | G06K 9/00 |

FOREIGN PATENT DOCUMENTS

| | | |
|---|---|---|
| CN | 104751143 A | 7/2015 |
| CN | 204791050 U | 11/2015 |
| CN | 105138968 A | 12/2015 |
| CN | 105550658 A | 5/2016 |

OTHER PUBLICATIONS

The State Intellectual Property Office of the People's Republic of China (SIPO) Office Action 1 for 201510843973.6 dated Jan. 17, 2019 11 Pages (including translation).

Dong Chen et al., "Bayesian Face Revisited: A Joint Formulation", ECCV 2012 Lecture Notes in Computer Science, Dec. 31, 2012 (Dec. 31, 2012), p. 5, 11. 14 Pages.

\* cited by examiner

IMAGE RECOGNITION METHOD AND APPARATUS

RELATED APPLICATION

This application is a continuation application of PCT Patent Application No. PCT/CN2016/084418, filed on Jun. 2, 2016, which claims priority to China Patent Application No. 201510843973.6, filed with the Chinese Patent Office on Nov. 26, 2015 and entitled "FACIAL RECOGNITION METHOD AND APPARATUS", the entire contents of both of which are incorporated herein by reference.

FIELD OF THE TECHNOLOGY

The present disclosure relates to the field of computer technologies, and in particular, to an image recognition method and apparatus.

BACKGROUND OF THE DISCLOSURE

A facial recognition technology usually includes two steps. First, a feature is extracted from a face image; second, a similarity between the extracted feature and a feature in a reference face image is calculated.

The similarity between features is usually calculated based on a Mahalanobis distance. However, limited by a Mahalanobis distance-based calculation algorithm, the accuracy of the similarity calculated by using the foregoing solution is relatively low.

SUMMARY

Embodiments of the present disclosure provide an image recognition method and apparatus to solve the above problems. Technical solutions are as follows:

According to one aspect, an image recognition method is provided, including: extracting a local binary pattern LBP feature vector of a target image; calculating a high-dimensional feature vector of the target image according to the LBP feature vector; obtaining a training matrix, the training matrix being a matrix obtained by training images in an image library by using a joint Bayesian algorithm; and performing image recognition on the target image according to the high-dimensional feature vector of the target image and the training matrix.

According to another aspect, an image recognition apparatus is provided, including: at least one processor; and a memory, the memory storing program instructions, and the image recognition apparatus being configured to perform the following operations when the program instructions are performed by the processor: extracting a local binary pattern LBP feature vector of a target image; calculating a high-dimensional feature vector of the target image according to the LBP feature vector; obtaining a training matrix, the training matrix being a matrix obtained by training images in an image library by using a joint Bayesian algorithm; and performing image recognition on the target image according to the high-dimensional feature vector of the target image and the training matrix.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

An image recognition method according to the embodiments of the present disclosure may be applied to a computing device 100. The computing device may be a terminal device such as a desktop computer, a mobile phone, a notebook computer, or a tablet computer; alternatively, the computing device may be a server. Specifically, referring to FIG. 1, the computing device 100 includes a central processing unit (CPU) 101, a system memory 104 including a random access memory (RAM) 102 and a read-only memory (ROM) 103, and a system bus 105 connecting the system memory 104 and the central processing unit 101. The computing device 100 further includes a basic input/output system (I/O system) 106 used for helping information transmission between components in a computer, and a large-capacity storage device 107 used for storing an operating system 113, an application program 114, and another program module 115.

Figure 1:
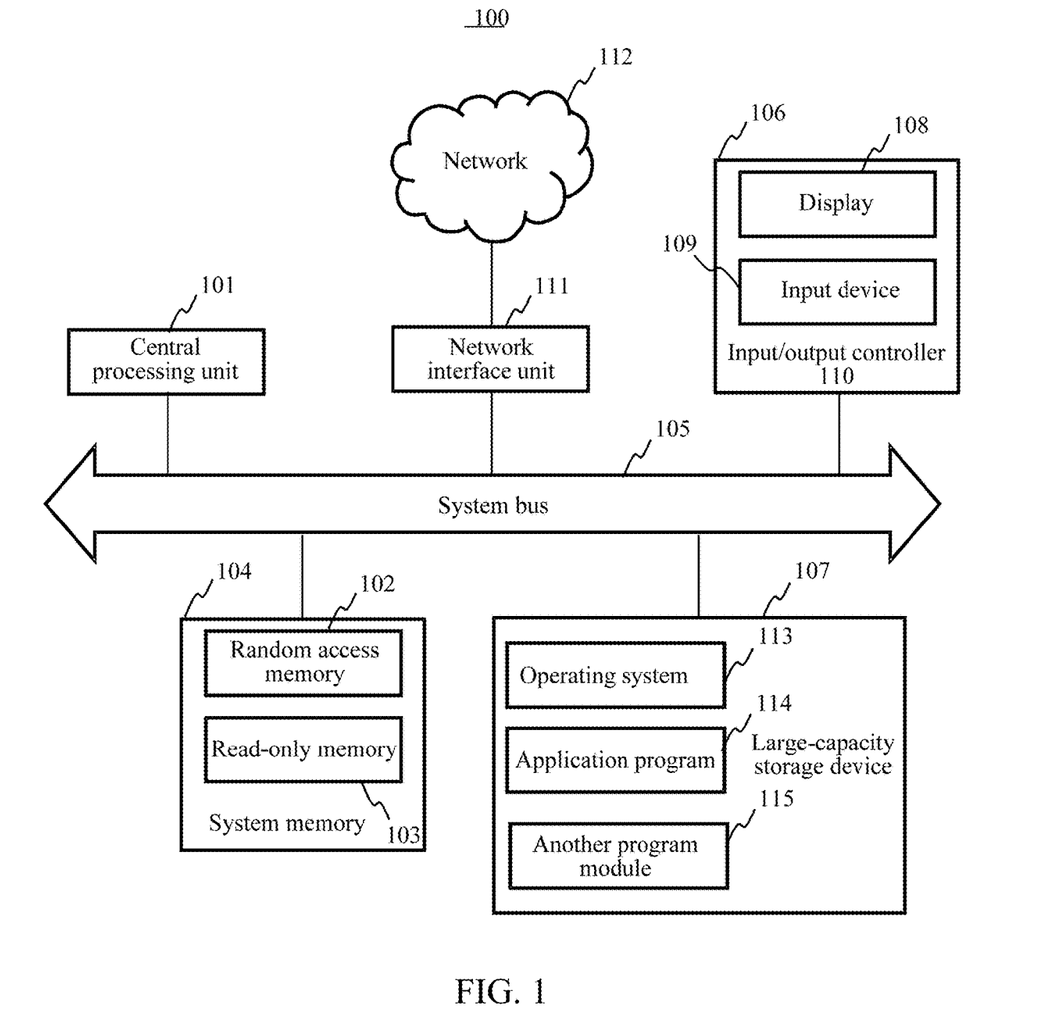
FIG. 1 is a block diagram of a computing device related to an image recognition method according to embodiments of the present disclosure.

The basic input/output system 106 includes a display 108 configured to display information, and an input device 109 configured to input information by a user, such as a mouse and a keyboard. The display 108 and the input device 109 are both connected to the central processing unit 101 by using an input/output controller 110 connected to the system bus 105. The basic input/output system 106 may further include the input/output controller 110, so as to receive and process input from multiple other devices such as a keyboard, a mouse, and an electronic stylus. Similarly, the input/output controller 110 further provides output to a display screen, a printer, or another type of output device.

The large-capacity storage device 107 is connected to the central processing unit 101 by using a large-capacity storage controller (not shown) connected to the system bus 105. The large-capacity storage device 107 and an associated computer-readable medium provide non-volatile storage to the computing device 100. That is, the large-capacity storage device 107 may include a computer-readable medium (not shown) such as a hard disk or a CD-ROM driver.

In general, the computer-readable medium may include a computer storage medium and a communications medium. The computer storage medium includes volatile, non-volatile, removable, and non-removable medium implemented by using any method or technology, so as to store information such as a computer-readable instruction, a data structure, a program module, or other data. The computer storage medium includes a RAM, a ROM, an EPROM, an EEPROM, a flash memory or another solid-state storage technology, a CD-ROM, a DVD or another optical storage device, a tape cartridge, a tape, a disk storage device or another magnetic storage device. Certainly, a person in the art may know that the computer storage medium is not limited to the foregoing types. The system memory 104 and the large-capacity storage device 107 may be collectively referred to as a memory.

According to the embodiments of the present disclosure, the computing device 100 may further be connected to a remote computer on a network through a network, such as Internet, and run thereon. That is, the computing device 100 may be connected to a network 112 by using a network interface unit 111 connected on the system bus 105, or may be connected to a network of another type or a remote computer system (not shown) by using the network interface unit 111.

The memory further includes one or more programs, where the one or more programs are stored in the memory, and the one or more programs are used for performing an image recognition method provided in the following embodiments.

The present disclosure integrates LBP feature extraction and joint Bayesian classification scheme to provide a stable, accurate, fast and flexible face recognition method. The disclosed method can recognize not only faces with various gestures and expressions but also faces with blocked view (wearing sunglasses, a mask, etc.) and faces under strong lighting effects. Further, the disclosed method can achieve fast calculation (real-time calculation), and is versatile in various applications. The algorithm outputs confidence level between 0 and 100, such that users (e.g. a service provider of security applications based on face validation) can obtain different accuracy rates and recall rates by setting different thresholds. In addition, the disclosed method greatly reduces the time complexity and spatial complexity of the algorithm when the amount of training samples is large in number, and saves manpower cost more than ten times.

Figure 2:
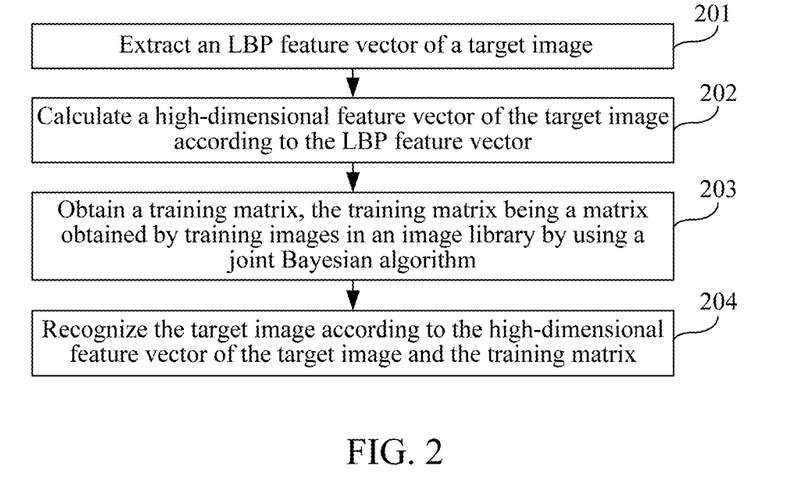
FIG. 2 is a flowchart of an image recognition method according to an embodiment of the present disclosure.

Referring to FIG. 2, FIG. 2 is a flowchart of an image recognition method according to an embodiment of the present disclosure, and the image recognition method may be applied to the computing device shown in FIG. 1. As shown in FIG. 2, the image recognition method may include:

Step 201. Extract an LBP feature vector of a target image.

LBP (Local Binary Pattern, local binary pattern) is an image texture description operator, and can express local texture information of an image and is invariant to light exposure. During actual implementation, a uniform encoding mode may be used for encoding, achieving features such as relatively low computational complexity, low memory consumption, and a quick computational speed.

Step 202. Calculate a high-dimensional feature vector of the target image according to the LBP feature vector.

Step 203. Obtain a training matrix, the training matrix being a matrix obtained by training images in an image library by using a joint Bayesian algorithm.

Step 204. Recognize the target image according to the high-dimensional feature vector of the target image and the training matrix.

In conclusion, in the image recognition method provided in this embodiment, an LBP feature vector of a target image is extracted by using an LBP algorithm, image recognition is further performed on the target image according to the LBP feature vector and a training matrix, and the training matrix is a matrix obtained by training an image library by using a joint Bayesian algorithm. The accuracy of image recognition is relatively high. Image recognition is performed by combining the LBP algorithm with the joint Bayesian algorithm, so that the accuracy of image recognition is improved. An example of the foregoing image is a face image. Images in the image library include images of a user at different angles, with different expressions, or under different light exposure. Therefore, the method can still have relatively high accuracy of facial recognition when a face is shaded or light exposed on the face changes intensely.

Figure 3A:
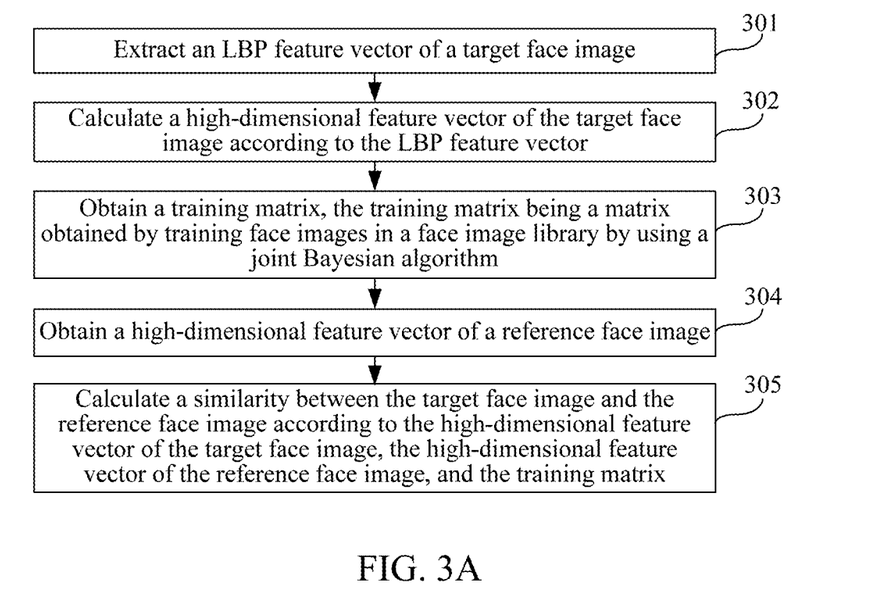
FIG. 3A is a flowchart of an image recognition method according to another embodiment of the present disclosure.

Referring to FIG. 3A, FIG. 3A is a flowchart of an image recognition method according to an embodiment of the present disclosure. This embodiment is described by taking a face image as an example. A person skilled in the art can understand that the method of this embodiment may also be used to recognize other images. The method may be implemented by the computing device shown in FIG. 1. That the computing device is a terminal (for example, a computer, a mobile phone, or a tablet computer) is used as an example for description in the following, and a person skilled in the art can understand that the present disclosure is not limited thereto. As shown in FIG. 3A, the image recognition method may include:

Step 301. Extract an LBP feature vector of a target face image.

The target image is an entered to-be-recognized image.

Figure 3B:
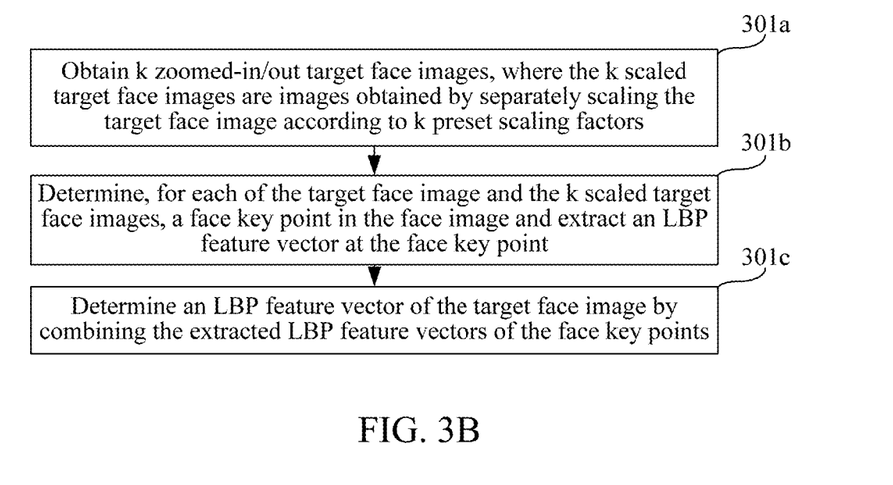
FIG. 3B is a flowchart of a method of extracting an LBP feature vector of a target image according to an embodiment of the present disclosure.

Optionally, referring to FIG. 3B, the step may include:

Step 301*a*. Obtain k scaled target face images, the k scaled target face images are images obtained by separately scaling the target face image according to k preset scaling factors.

The terminal may separately scale the target face image according to each of k preset scaling factors to obtain k scaled target face images, where k is a positive integer, and k preset scaling factors may be distributed uniformly. Additionally, an example of scaling in this embodiment is zooming out a target face image.

For example, k is 4, and the terminal may zoom out the target face image according to scaling factors 1.25, 1.5, 1.75, and 2, so that 4 zoomed-out target face images are obtained. This embodiment has no limitation on the value of k or a specific numerical value of each preset scaling factor.

Step 301*b*. Determine, for each of the target face image and the k scaled target face images, a face key point in the face image and extract an LBP feature vector at the face key point.

This step may include:

1. Recognize a face block in the target face image.
2. Locate five senses of the face in the face block, to obtain face key points. Face key points may include: left and right eyebrows, left and right eyes, a nose, left and right corners of the mouth, and the like.

Figure 3C:
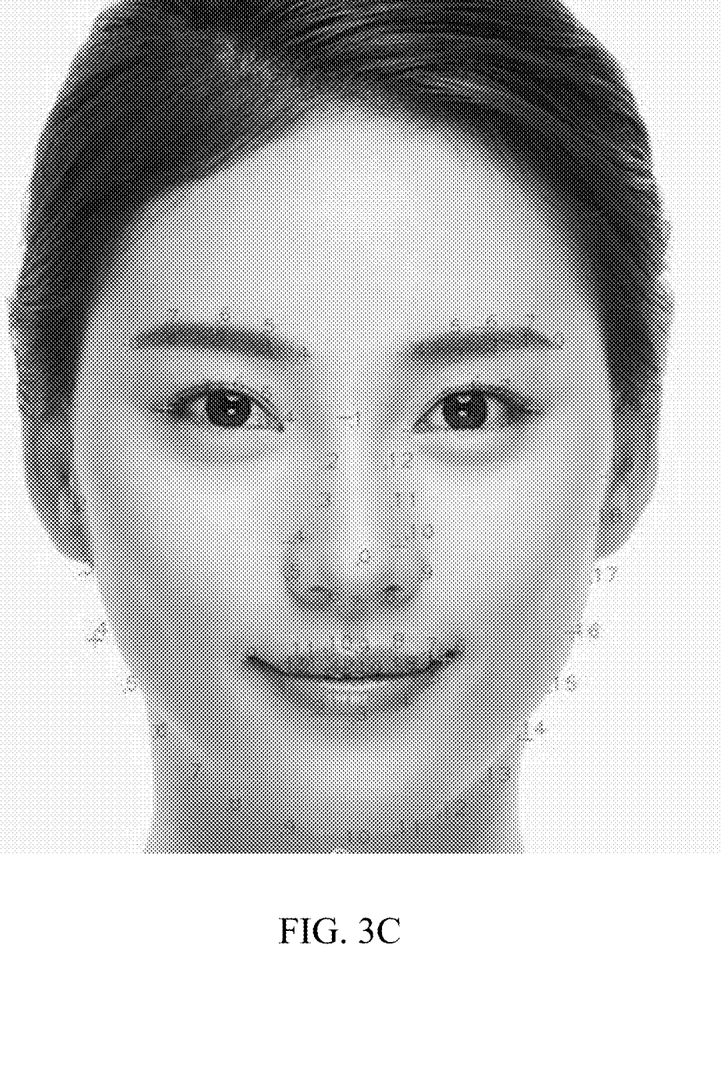
FIG. 3C is a schematic diagram of image key points located by a terminal according to an embodiment of the present disclosure.

For example, referring to FIG. 3C, the terminal may locate to obtain face key points shown in the figure.

3. For each face key point, extract LBP features in a preset area centered around the face key point.

Optionally, the terminal may extract LBP features in the preset area by means of uniform encoding to obtain an LBP feature histogram. The preset area may be an a*a area and a is a positive integer. Optionally, the terminal may extract an LBP feature in each cell in the preset area by means of uniform encoding.

Figure 3D:
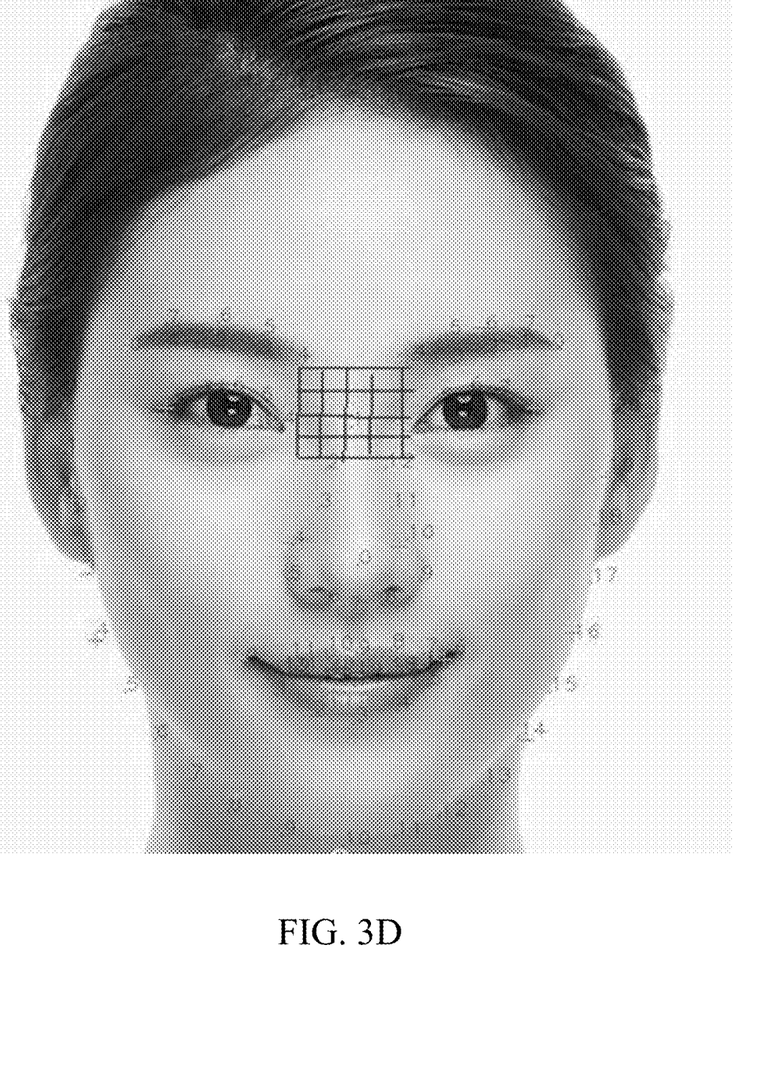
FIG. 3D is a schematic diagram of a target image when an LBP feature vector is extracted according to an embodiment of the present disclosure.

For example, referring to FIG. 3D, the preset area may be a 4*4 area centered around the face key point, and for each cell in the figure, the terminal may calculate to obtain an LBP feature distribution histogram of 59-dimensions.

Step 301c. Determine an LBP feature vector of the target face image by combining the extracted LBP feature vectors of the face key points.

After performing extraction on all face images, the terminal may obtain u LBP features. For example, for a face image shown in FIG. 3D, the terminal may extract 59*27*16 LBP features.

After performing extraction on the target face image and the k scaled target face images, the terminal may obtain Y LBP features. Y=u*(k+1). For example, when k is 4, for a face image shown in FIG. 3D, the terminal may extract 5*59*27*16 LBP features.

The terminal uses each extracted LBP feature as a parameter in an LBP feature vector, thereby obtaining, by means of combination, an LBP feature vector including all LBP features. Optionally, the terminal may use the LBP features extracted from each face image as a line or a row of an LBP feature vector, thereby obtaining an LBP feature vector including k+1 lines or k+1 rows.

Step 302. Calculate a high-dimensional feature vector of the target face image according to the LBP feature vector.

It is set that the LBP feature vector of the target face image is $x_r$.

First, principal component analysis (PCA) dimension reduction is performed on $X_r^T x_r$, and features of the first N dimensions are reserved, to obtain a reduced-dimension matrix P, N being a positive integer, and $x_r^T$ being a transposed vector of $x_r$.

N is greater than a first threshold and less than a second threshold, and usually, N may be 1440. PCA dimension reduction is a common dimension reduction method for processing an image, and in PCA dimension reduction, an original feature vector is mapped to a low-dimension space by means of linear transformation.

Second, for $x_r$, the following calculation is performed: $x_p = P x_r$.

Third, latent Dirichlet allocation (LDA) dimension reduction is performed on $x_p$ to obtain a reduced-dimension matrix L.

Fourth, for $x_p$, the following calculation is performed: $x = L x_p$, where x is a high-dimensional feature vector of the target face image.

Step 303. Obtain a training matrix, the training matrix being a matrix obtained by training face images in a face image library by using a joint Bayesian algorithm.

The training matrix may be a matrix locally stored in advance, or may be a matrix obtained from a server by the terminal.

Step 304. Obtain a high-dimensional feature vector of a reference face image.

The high-dimensional feature vector of the reference face image may be a locally-stored vector. The high-dimensional feature vector may be calculated by the terminal in advance and stored locally, or may be obtained, by the terminal, from the server and stored locally, and this is not limited by this embodiment.

Additionally, the calculation method of the high-dimensional feature vector of the reference face image is similar to the calculation method of the high-dimensional feature vector of the target face image. Refer to step 301 and step 302 for technical details. The method is not limited by this embodiment.

Step 305. Calculate a similarity between the target face image and the reference face image according to the high-dimensional feature vector of the target face image, the high-dimensional feature vector of the reference face image, and the training matrix.

Optionally, if the high-dimensional feature vector of the target face image is $x_1$, the high-dimensional feature vector of the reference face image is $x_2$, and the training matrix includes A and G, the similarity between the target face image and the reference face image is:

$$r(x_1, x_2) = x_1^T A x_1 + x_2^T A x_2 - 2 x_1^T G x_2;$$

$x_1^T$ is a transposed vector of $x_1$, and $x_2^T$ is a transposed vector of $x_2$.

Optionally, before calculating the similarity, the terminal may perform the following steps:

First, obtain a mean value M of all features in the face image library.

The specific step may include: obtaining an LBP feature vector of each face image in the face image library and calculating the mean value M of all features of the obtained LBP feature vector. The method for obtaining, by the terminal, the LBP feature vector of a face image is similar to the method for obtaining the LBP feature vector of the target face image in this embodiment, and details are not described again in this embodiment.

Second, perform normalization on $x_1$ and $x_2$.

For example, let $x_1 = x_{1-M}$; $x_2 = x_{2-M}$.

By performing normalization on $x_1$ and $x_2$, $x_1$ and $x_2$ are distributed by using 0 as a center, thereby improving the calculation efficiency of the similarity.

Additionally, this embodiment is described by using an example in which facial recognition is performed on the target face image according to the similarity. After calculating the similarity, the terminal may calculate a variance between the high-dimensional feature vector of the target face image and the high-dimensional feature vector of the reference face image to further perform facial recognition by using the calculated variance.

Specifically, the step of calculating the variance may include:

First, obtain a mean value r1 and a variance $s_1$ of high-dimensional feature vectors of one person in the face image library.

For m*n face images in the face image library, a similarity $r(x_1, x_2)$ of any two face images, in n face images of one person, is calculated to obtain (n−1) $r(x_1, x_2)$; for m persons in the face image library, a total of (n−1)*m $r(x_1, x_2)$ are obtained; a mean value r1 and a variance $s_1$ of (n−1)*m $r(x_1, x_2)$ are calculated.

Second, calculate a variance s according to the calculated mean value r1, variance $s_1$, and similarity, where the variance s is:

$$s = \frac{r(x_1, x_2) - r_1}{3 s_1} * 100.$$

After calculating the variance s, the terminal may normalize the calculated s to an interval from 0 to 100. The value of s indicates a probability that the target face image and the reference face image belong to a same person. In other words, s is a confidence whose value is between 0 and 100. A greater value of s indicates a higher probability that the two face images belong to a same person.

Optionally, a threshold may be specified, and when s is greater than the specified threshold, it is determined that the target face image and the reference face image belong to a same person; when s is less than the specified threshold, it is determined that the target face image and the reference face image do not belong to a same person. The specified threshold may be set to a value not less than 50 and not greater than 100, and a designer may set the threshold according to required recognition accuracy. If the required accuracy is relatively high, the threshold is set to a relatively large value such as 90; if the required accuracy is relatively low, the threshold may be set to a relatively small value such as 60.

In conclusion, in the facial recognition method provided in this embodiment, an LBP feature vector of a target face image is extracted by using an LBP algorithm, and facial recognition is performed on the target face image according to the LBP feature vector and a training matrix, the training matrix being a matrix obtained by training a face image library by using a joint Bayesian algorithm. The accuracy of image recognition is relatively high. Facial recognition is performed by combining the LBP algorithm with the joint Bayesian algorithm, so that the accuracy of facial recognition is improved. Moreover, images in the face image library may include images of a user at different angles, with different expressions, or under different light exposure. Therefore, the method can still have relatively high accuracy of facial recognition when a face is shaded or light on the face changes intensely.

In this embodiment, a high-dimensional feature vector of a face image is calculated according to the face image and images that are obtained by scaling the face image according to preset scaling factors, where an example of the preset scaling factor is a scaling factor used for zooming out the image, so that the robustness of size transformation is improved.

Additionally, when facial recognition is performed in this embodiment, a variance may be calculated, and different thresholds may be set for the variance according to different required recognition accuracy, thereby better meeting actual application requirements.

It should be noted that, in the foregoing embodiment, the terminal may obtain, from the server, a training matrix that is trained by the server in advance, or the terminal may obtain a training matrix that is trained in advance by the terminal and is stored locally; this is not limited by this embodiment. The following description is provided by using an example in which the terminal calculates and stores a training matrix, and specific steps are as follows:

First, obtain a high-dimensional feature vector of each person corresponding to images in a face image library.

The face image library includes m*n face images, m being the number of persons corresponding to images in the face image library, and n being the number of face images of each person. M and n are both positive integers, and n face images of each person may include face images of a user at different angles, under different light exposure conditions, and with different expressions.

1. For each face image in the face image library, extract an LBP feature vector of the face image.

This step is similar to step 301 and step 302 in the foregoing embodiment, and for technical details, refer to the foregoing embodiment. Details are not herein again in this embodiment.

2. Calculate a mean value of all features in the LBP feature vector of the face image.

3. Subtract the mean value from features in the LBP feature vector of the face image to obtain a feature vector $x_r=\{x_{ri}, 0 \leq i < m*n\}$, where $x_{ri}$ represents an LBP feature vector of the face image after mean value processing.

4. Perform PCA dimension reduction on $x_r^T x_r$, and reserve features of the first N dimensions, to obtain a reduced-dimension matrix P, N being a positive integer, and $x_r^T$ being a transposed vector of $x_r$.

5. For $x_r$, calculate $x_p = P x_r$.

6. For face images of each person, perform LDA dimension reduction on $x_p$ to obtain a reduced-dimension matrix L.

7. For each $x_p$, calculate $x = L x_p$, where x is a high-dimensional feature vector of a person.

Second, initialize $S_\mu$ and $S_\varepsilon$; $S_\mu$ is an m-dimensional square matrix and is a covariance matrix of n face images of each person in the face image library; and $S_\varepsilon$ is an m*n square matrix and is a covariance matrix of images of different persons in the face image library.

Third, calculate F and G: $F = S_\mu^{-1}$, $G = -(mS_\mu + S_\varepsilon)^{-1} S_\mu S_\varepsilon^{-1}$.

Fourth, calculate a mean value $\mu_i$ of Gaussian distribution of an $i^{th}$ person in the face image library: $\mu_i = \Sigma_{i=1}^{m} S_\mu (F + mG) x_i$, and a joint distribution covariance matrix $\varepsilon_{ij}$ of the $i^{th}$ person and a $j^{th}$ person according to F and G: $\varepsilon_{ij} = x_j + \Sigma_{i=1}^{m} S_\varepsilon G x_i$, $x_i$ being a high-dimensional feature vector of the $i^t$ person, and $x_j$ being a high-dimensional feature vector of the $j^{th}$ person.

Fifth, update $S_\mu$ and $S_\varepsilon$ according to the following formula:

$$S_\mu = \text{cov}(\mu) = m^{-1} \sum_i \mu_i \mu_i^T, \quad S_\varepsilon = \text{cov}(\varepsilon) = m^{-1} \sum_i \sum_j \varepsilon_{ij} \varepsilon_{ij}^T$$

$\mu_i^T$ is a transposed vector of $\mu_i$, and $\varepsilon_{ij}^T$ is a transposed vector of $\varepsilon_{ij}$.

Sixth, if $S_\mu$ and $S_\varepsilon$ are not convergent, perform the step of calculating F and G again.

Seventh, if $S_\mu$ and $S_\varepsilon$ are convergent, calculate and store a training matrix according to F and G corresponding to the convergent $S_\mu$ and $S_\varepsilon$, and the convergent $S_\mu$ and $S_\varepsilon$, where the training matrix includes $A = (S_\mu + S_\varepsilon)^{-1} - (F+G)$, $G = -(mS_\mu + S_\varepsilon)^{-1} S_\mu S_\varepsilon^{-1}$.

It should be further noted that, the facial recognition method provided in the foregoing embodiment may be applied to multiple application scenarios. For example, the method may be applied to scenarios such as Internet finance identity check, facial recognition, facial attributes recognition, face beautifying, face cartoonizing, face tracking, lip-language recognition, and living body recognition, or applied to products such as instant communications application programs, social application and sharing platforms, watermark cameras, creative cameras, and Pitu. The most direct application of the technical solution of embodiments of the present disclosure is calculation of a similarity between two faces according to two face images entered, which may be applied to multiple service scenarios such as facial recognition, and face similarity calculation.

Figure 4:
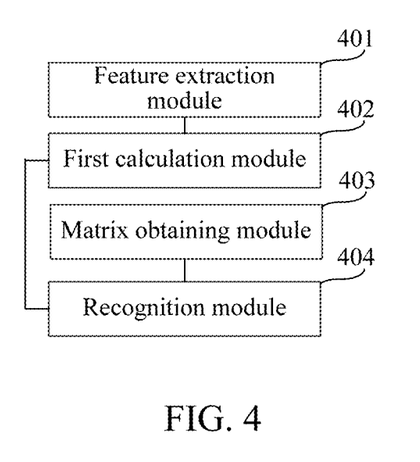
FIG. 4 is a structural block diagram of an image recognition apparatus according to an embodiment of the present disclosure.

Referring to FIG. 4, FIG. 4 is a structural block diagram of an image recognition apparatus according to an embodiment of the present disclosure. The image recognition apparatus may include: a feature extraction module 401, a first calculation module 402, a matrix obtaining module 403, and a recognition module 404.

The feature extraction module 401 is configured to extract a local binary pattern LBP feature vector of a target image.

The first calculation module 402 is configured to calculate a high-dimensional feature vector of the target image according to the LBP feature vector extracted by the feature extraction module 401.

The matrix obtaining module 403 is configured to obtain a training matrix, the training matrix being a matrix obtained by training images in an image library by using a joint Bayesian algorithm; and The recognition module 404 is configured to recognize the target image according to the high-dimensional feature vector of the target image calculated by the first calculation module 402 and the training matrix obtained by the matrix obtaining module 403.

In conclusion, in the image recognition apparatus provided in this embodiment, an LBP feature vector of a target image is extracted by using an LBP algorithm, and the target image is recognized according to the LBP feature vector and a training matrix, the training matrix being a matrix obtained by training an image library by using a joint Bayesian algorithm. The accuracy of image recognition is relatively high. Image recognition is performed by combining the LBP algorithm with the joint Bayesian algorithm, so that the accuracy of image recognition is improved. An example of the foregoing image is a face image. Images in the image library may include images of a user at different angles, with different expressions, or under different light exposure. Therefore, the method can still have relatively high accuracy of facial recognition when a face is shaded or light on the face changes intensely.

Figure 5:
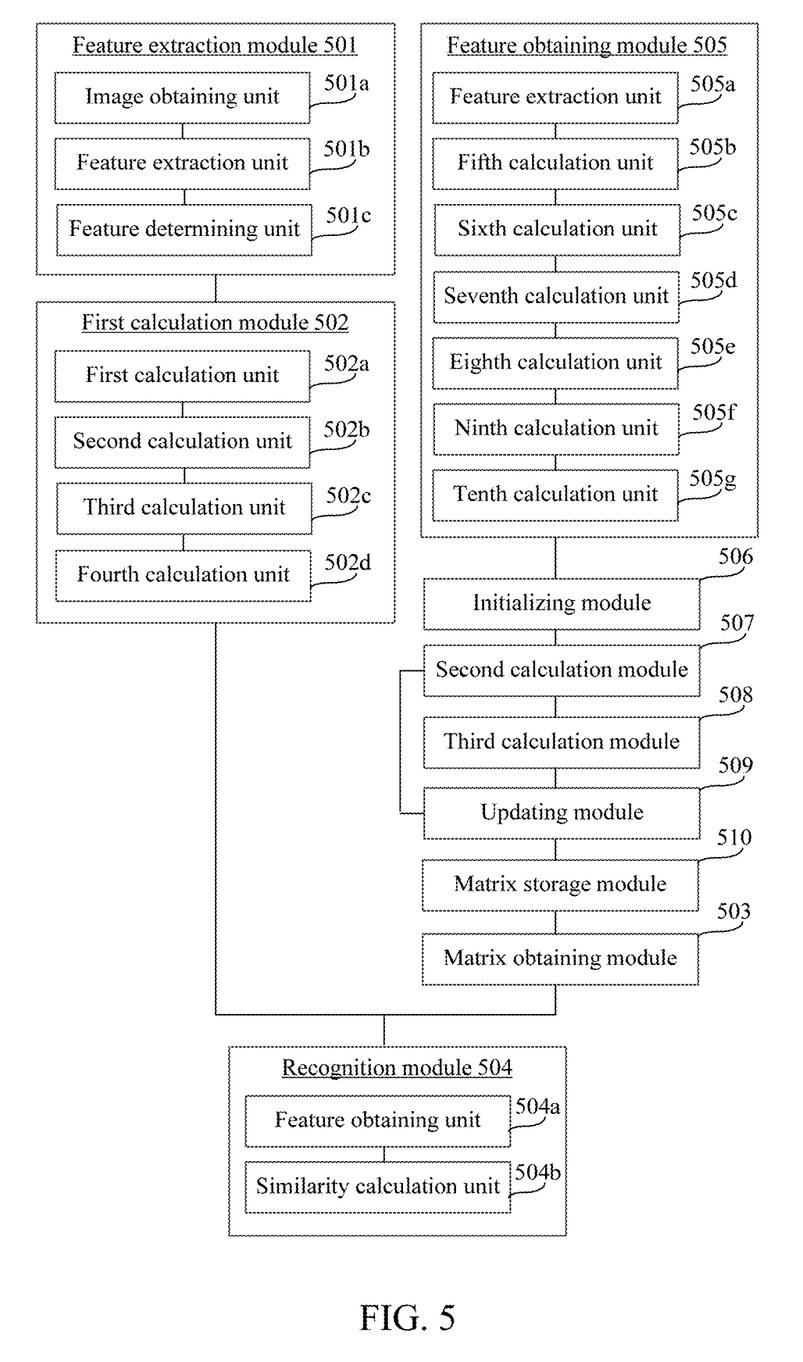
FIG. 5 is a structural block diagram of an image recognition apparatus according to another embodiment of the present disclosure.

Referring to FIG. 5, FIG. 5 is a structural block diagram of an image recognition apparatus according to an embodiment of the present disclosure. The image recognition apparatus may include: a feature extraction module 501, a first calculation module 502, a matrix obtaining module 503, and a recognition module 504.

The feature extraction module 501 is configured to extract a local binary pattern LBP feature vector of a target image.

The first calculation module 502 is configured to calculate a high-dimensional feature vector of the target image according to the LBP feature vector extracted by the feature extraction module 501.

The matrix obtaining module 503 is configured to obtain a training matrix, the training matrix being a matrix obtained by training images in an image library by using a joint Bayesian algorithm.

The recognition module 504 is configured to perform recognition on the target image according to the high-dimensional feature vector of the target image calculated by the first calculation module 502 and the training matrix obtained by the matrix obtaining module 503.

Optionally, the recognition module 504 includes:

a feature obtaining unit 504*a*, configured to obtain a high-dimensional feature vector of a reference image;

a similarity calculation unit 504*b*, configured to calculate a similarity between the target image and the reference image according to the high-dimensional feature vector of the target image, the high-dimensional feature vector of the reference image, and the training matrix when the high-dimensional feature vector of the target image is $x_1$, the high-dimensional feature vector of the reference image is $x_2$, and the training matrix includes A and G.

$$r(x_1,x_2)=x_1^T A x_1 + x_2^T A x_2 - 2 x_1^T G x_2;$$

$x_1^T$ is a transposed vector of $x_1$, and $x_2^T$ is a transposed vector of $x_2$.

Optionally, the image library includes the target image and the reference image.

Optionally, the feature extraction module 501 includes:

an image obtaining unit 501*a*, configured to obtain k scaled images, where the k scaled images are images obtained by separately scaling the target image according to k preset scaling factors, and k is a positive integer;

a feature extraction unit 501*b*, configured to determine, for each of the target image and the k scaled images, a key point in the image and extract an LBP feature vector at the key point;

a feature determining unit 501*c*, configured to determine the LBP feature vector of the target image according to the LBP feature vector of the extracted key point.

Optionally, the first calculation module 502 includes:

a first calculation unit 502*a*, configured to: when the LBP feature vector of the target image is $x_r$, perform PCA dimension reduction on $x_r^T x_r$, and reserve features of the first N dimensions, to obtain a reduced-dimension matrix P, N being a positive integer, $x_r$ being the LBP feature vector of the target image, and $x_r^T$ being a transposed vector of $x_r$;

a second calculation unit 502*b*, configured to: for $x_r$, calculate $x_p = P x_r$;

a third calculation unit 502*c*, configured to perform LDA dimension reduction on $x_p$ to obtain a reduced-dimension matrix L; and a fourth calculation unit 502*d*, configured to: for $x_p$, calculate $x = L x_p$, where x is the high-dimensional feature vector of the target image.

Optionally, the image is a face image, the image library is a face image library, and the face image library includes m*n face images, m being the number of people corresponding to images in the face image library, and n being the number of face images of each person.

The apparatus further includes:

a feature obtaining module 505, configured to obtain a high-dimensional feature vector of each person corresponding to images in the face image library before the matrix obtaining module 503 obtains the training matrix;

an initializing module 506, configured to initialize $S_\mu$ and $S_\varepsilon$, where $S_\mu$ is an m-dimensional square matrix and is a covariance matrix of n face images of each person in the face image library; and $S_\varepsilon$ is an m*n square matrix and is a covariance matrix of images of different persons in the face image library;

a second calculation module 507, configured to calculate F and G:

$$F = S_\mu^{-1}, G = -(m S_\mu + S_\varepsilon)^{-1} S_\mu S_\varepsilon^{-1};$$

a third calculation module 508, configured to calculate a mean value $\mu_i$ of Gaussian distribution of an $i^{th}$ person in the face image library: $\mu_i = \Sigma_{i=1}^{m} S_\mu (F+mG) x_i$ and a joint distribution covariance matrix $\varepsilon_{ij}$ of the $i^{th}$ person and a $j^{th}$ person according to F and G: $\varepsilon_{ij} = x_j + \Sigma_{i=1}^{m} S_\varepsilon G x_i$, $x_i$ being a high-dimensional feature vector of the $i^{th}$ person and $x_j$ being a high-dimensional feature vector of the $j^{th}$ person;

an updating module 509, configured to update $S_\mu$ and $S_\varepsilon$:

$$S_\mu = \operatorname{cov}(\mu) = m^{-1} \sum_i \mu_i \mu_i^T, \quad S_\varepsilon = \operatorname{cov}(\varepsilon) = m^{-1} \sum_i \sum_j \varepsilon_{ij} \varepsilon_{ij}^T,$$

$\mu_i^T$ being a transposed vector of $\mu_i$, and $\varepsilon_{ij}^T$ being a transposed vector of $\varepsilon_{ij}$;

the second calculation module 507 is further configured to perform the step of calculating F and G again if $S_\mu$ and $S_\varepsilon$ are not convergent; and a matrix storage module 510, configured to calculate and store the training matrix, $A=(S_\mu+S_\varepsilon)^{-1}-(F+G)$ and $G=-(mS_\mu+S_\varepsilon)^{-1}S_\mu S_\varepsilon^{-1}$, according to F and G corresponding to the convergent $S_\mu$ and $S_\varepsilon$ and the convergent $S_\mu$ and $S_\varepsilon$.

Optionally, the feature obtaining module 505 includes:

a feature extraction unit 505a, configured to extract, for each face image in the face image library, an LBP feature vector of the face image;

a fifth calculation unit 505b, configured to calculate a mean value of all features in the LBP feature vector of the face image;

a sixth calculation unit 505c, configured to subtract the mean value from features in the LBP feature vector of the face image to obtain an feature vector $x_r=\{x_{ri},0<i<m*n\}$, where $x_{ri}$ represents an LBP feature vector of the face image after mean value processing;

a seventh calculation unit 505d, configured to perform PCA dimension reduction on $x_r^T x_r$, and reserve features of the first N dimensions, to obtain a reduced-dimension matrix P, N being a positive integer, and $x_r^T$ being a transposed vector of $x_r$;

an eighth calculation unit 505e, configured to: for $x_r$, calculate $x_p=Px_r$;

a ninth calculation unit 505f, configured to: for face images of each person, perform LDA dimension reduction on $x_p$ to obtain a reduced-dimension matrix L; and a tenth calculation unit 505g, configured to: for each $x_p$, calculate $x=Lx_p$, where x is a high-dimensional feature vector of a person.

In conclusion, in the image recognition apparatus provided in this embodiment, an LBP feature vector of a target image is extracted by using an LBP algorithm, and the target image is recognized according to the LBP feature vector and a training matrix, the training matrix being a matrix obtained by training an image library by using a joint Bayesian algorithm. The accuracy of image recognition is relatively high. Image recognition is performed by combining the LBP algorithm with the joint Bayesian algorithm, so that the accuracy of recognition is improved. An example of the foregoing image is a face image. Images in the image library may include images of a user at different angles, with different expressions, or under different light exposure. Therefore, the method can still have relatively high accuracy of facial recognition when a face is shaded or light on the face changes intensely.

In this embodiment, a high-dimensional feature vector of an image is calculated according to the image and images that are obtained by scaling the image according to preset scaling factors, where the preset scaling factors may be scaling factors used for zooming out the image, so that the robustness of size transformation is improved.

Additionally, when image recognition is performed in this embodiment, a variance may be calculated, and different thresholds may be set for the variance according to different required recognition accuracy, thereby better meeting actual application requirements.

An LBP feature vector of a target image is extracted by using an LBP algorithm, and the target image is recognized according to the LBP feature vector and a training matrix, the training matrix being a matrix obtained by training an image library by using a joint Bayesian algorithm. Accuracy of image recognition is relatively high. The LBP algorithm is combined with the joint Bayesian algorithm to perform image recognition, thus improving the accuracy of image recognition. An example of the foregoing image is a face image. Images in the image library may include images of a user at different angles, with different expressions, or under different light exposure. Therefore, the method can still have relatively high accuracy of facial recognition when a face is shaded or light on the face changes intensely.

It should be noted that: when the image recognition apparatus provided in the foregoing embodiment performs image recognition, the division of the functional modules is merely used as an example for description. In the practical application, the functions may be distributed to and implemented by different functional modules according to the requirements, that is, an internal structure of a device is divided into different functional modules, so as to finish all or some of the functions described above. Additionally, the image recognition apparatus provided in the foregoing embodiment and the embodiment of the image recognition method belong to a same concept. For the specific implementation procedure, refer to the method embodiment, and details are not described herein again.

The sequence numbers of the embodiments of the present disclosure are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An image recognition method, comprising:
   extracting a local binary pattern (LBP) feature vector of a target image, the target image being a face image;
   calculating a high-dimensional feature vector of the target image according to the LBP feature vector;
   obtaining a training matrix, the training matrix being a matrix obtained by training images in an image library by using a joint Bayesian algorithm, the image library comprising m*n face images, m being a number of persons corresponding to images in the image library, and n being a number of face images of each person; and
   performing image recognition on the target image according to the high-dimensional feature vector of the target image and the training matrix,
   wherein obtaining the training matrix comprises:
      obtaining a high-dimensional feature vector of each person corresponding to the face images in the image library;
      initializing a first covariance matrix of n face images of each person in the image library and a second covariance matrix of images of different persons in the image library, the first covariance matrix being an m-dimensional square matrix and the second covariance matrix being an m*n square matrix;
      calculating a mean value of Gaussian distribution of each person in the image library;
      calculating a joint distribution covariance matrix of two persons in the image library according to the first covariance matrix, the second covariance matrix, and the high-dimensional feature vectors of the two persons;

updating the first covariance matrix according to the mean value of Gaussian distribution, and updating the second covariance matrix according to the joint distribution covariance matrix; and obtaining the training matrix based on the updated first covariance matrix and the updated second covariance matrix.

2. The method according to claim 1, wherein performing image recognition on the target image according to the high-dimensional feature vector of the target image and the training matrix comprises:

obtaining a high-dimensional feature vector of a reference image;

calculating a similarity between the target image and the reference image according to the high-dimensional feature vector of the target image, the high-dimensional feature vector of the reference image, and the training matrix:

$$r(x_1, x_2) = x_1^T A x_1 + x_2^T A x_2 - 2 x_1^T G x_2;$$

wherein $x_1$ is the high-dimensional feature vector of the target image, $x_2$ is the high-dimensional feature vector of the reference image, $x_1^T$ a transposed vector of $x_1$, $x_2^T$ is a transposed vector of $x_2$, and A and G are training matrixes.

3. The method according to claim 2, wherein the image library comprises the target image and the reference image.

4. The method according to claim 1, wherein the extracting an LBP feature vector of a target image comprises:

separately scaling the target image according to k preset scaling factors to obtain k scaled images, k being a positive integer;

determining, for each of the target image and the k scaled images, a key point in the image, and extracting an LBP feature vector at the key point; and determining the LBP feature vector of the target image according to the extracted LBP feature vector of the key point.

5. The method according to claim 1, wherein the calculating a high-dimensional feature vector of the target image according to the LBP feature vector comprises:

performing principal component analysis (PCA) dimension reduction on $x_r^T x_r$, and reserving features of first N dimensions, to obtain a reduced-dimension matrix P, N being a positive integer, $x_r$ being the LBP feature vector of the target image, and $x_r^T$ being a transposed vector of $x_r$;

for $x_r$, calculating $X_p = P x_r$;

performing latent Dirichlet allocation (LDA) dimension reduction on $x_p$ to obtain a reduced-dimension matrix L; and calculating the high-dimensional feature vector of the target image $x = L x_p$.

6. The method according to claim 1, wherein obtaining the training matrix, further comprises:

initializing the first covariance matrix $S_\mu$ of n face images of each person in the image library and the second covariance matrix $S_\varepsilon$ of images of different persons in the image library;

calculating F and G: $F = S_\mu^{-1}$, $G = -(mS_\mu + S_\varepsilon)^{-1} S_\mu S_\varepsilon^{-1}$;

calculating the mean value $\mu_i$ of Gaussian distribution of an $i^{th}$ person in the image library: $\mu_i = \Sigma_{i=1}^m S_\mu (F + mG) x_i$, and the joint distribution covariance matrix $\varepsilon_{ij}$ of the $i^{th}$ person and a $j^{th}$ person according to F and G:

$\varepsilon_{ij} = x_j + \Sigma_{i=1}^m S_\varepsilon G x_i$, $x_i$ being a high-dimensional feature vector of the $i^{th}$ person, and $x_j$ being a high-dimensional feature vector of the $j^{th}$ person;

updating $S_\mu$ and $S_\varepsilon$ according to the following formula:

$$S_\mu = \text{cov}(\mu) = m^{-1} \sum_i \mu_i \mu_i^T, \quad S_\varepsilon = \text{cov}(\varepsilon) = m^{-1} \sum_i \sum_j \varepsilon_{ij} \varepsilon_{ij}^T$$

wherein $\mu_i^T$ is a transposed vector of $\mu_i$, and $\varepsilon_{ij}^T$ is a transposed vector of $\varepsilon_{ij}$; and calculating the training matrixes $A = (S_\mu + S_\varepsilon)^{-1} - (F + G)$ and $G = -(mS_\mu + S_\varepsilon)^{-1} S_\mu S_\varepsilon^{-1}$ according to the updated $S_\mu$ and $S_\varepsilon$, F, and G.

7. The method according to claim 6, further comprising:

determining whether the updated $S_\mu$ and $S_\varepsilon$ are convergent; and if the updated $S_\mu$ and $S_\varepsilon$ are not convergent, performing the step of calculating F and G again; or if the updated $S_\mu$ and $S_\varepsilon$ are convergent, performing a step of calculating the training matrix according to F and G corresponding to the convergent $S_\mu$ and $S_\varepsilon$, and the convergent $S_\mu$ and $S_\varepsilon$.

8. The method according to claim 1, wherein the obtaining a high-dimensional feature vector of each person corresponding to the images in the image library comprises:

extracting, for each face image in the image library, an LBP feature vector of the face image;

calculating a mean value of all features in the LBP feature vector of the face image;

subtracting the mean value from each feature in the LBP feature vector of the face image to obtain a feature vector $x_r = \{x_{ri}, 0 < i < m*n\}$, wherein $x_{ri}$ represents an LBP feature vector of the face image after mean value processing;

performing PCA dimension reduction on $x_r^T x_r$, and reserving features of the first N dimensions, to obtain a reduced-dimension matrix P, N being a positive integer, and $x_r^T$ being a transposed vector of $x_r$;

for $x_r$, calculating $x_p = P x_r$;

performing, for face images of each person, LDA dimension reduction on $x_p$ to obtain a reduced-dimension matrix L; and calculating the high-dimensional feature vector of each person: $x = L x_p$.

9. An image recognition apparatus, comprising:

at least one processor; and a memory, the memory storing program instructions, and the image recognition apparatus being configured to perform the following operations when the program instructions are performed by the processor:

extracting a local binary pattern (LBP) feature vector of a target image, the target image being a face image;

calculating a high-dimensional feature vector of the target image according to the LBP feature vector;

obtaining a training matrix, the training matrix being a matrix obtained by training images in an image library by using a joint Bayesian algorithm, the image library comprising m*n face images, m being a number of persons corresponding to images in the image library, and n being a number of face images of each person; and performing image recognition on the target image according to the high-dimensional feature vector of the target image and the training matrix, wherein obtaining the training matrix comprises:
    obtaining a high-dimensional feature vector of each person corresponding to the face images in the image library;
    initializing a first covariance matrix of n face images of each person in the image library and a second covariance matrix of images of different persons in the image library, the first covariance matrix being an m-dimensional square matrix and the second covariance matrix being an m*n square matrix;
    calculating a mean value of Gaussian distribution of each person in the image library;
    calculating a joint distribution covariance matrix of two persons in the image library according to the first covariance matrix, the second covariance matrix, and the high-dimensional feature vectors of the two persons;
    updating the first covariance matrix according to the mean value of Gaussian distribution, and updating the second covariance matrix according to the joint distribution covariance matrix; and
    obtaining the training matrix based on the updated first covariance matrix and the updated second covariance matrix.

10. The apparatus according to claim 9, wherein the performing image recognition on the target image according to the high-dimensional feature vector of the target image and the training matrix comprises:
    obtaining a high-dimensional feature vector of a reference image;
    calculating a similarity between the target image and the reference image according to the high-dimensional feature vector of the target image, the high-dimensional feature vector of the reference image, and the training matrix:

$$r(x_1, x_2) = x_1^T A x_1 + x_2^T A x_2 - 2 x_1^T G x_2;$$

wherein $x_1$ is the high-dimensional feature vector of the target image, $x_2$ is the high-dimensional feature vector of the reference image, $x_1^T$ a transposed vector of $x_1$, $x_2^T$ is a transposed vector of $x_2$, and A and G are training matrixes.

11. The apparatus according to claim 10, wherein the image library comprises the target image and the reference image.

12. The apparatus according to claim 9, wherein the extracting an LBP feature vector of a target image comprises:
    separately scaling the target image according to k preset scaling factors to obtain k scaled images, k being a positive integer;
    determining, for each of the target image and the k scaled images, a key point in the image, and extracting an LBP feature vector at the key point; and
    determining the LBP feature vector of the target image according to the LBP feature vector of the extracted key point.

13. The apparatus according to claim 9, wherein the calculating a high-dimensional feature vector of the target image according to the LBP feature vector comprises:
    performing principal component analysis (PCA) dimension reduction on $x_r^T x_r$, and reserving features of first N dimensions, to obtain a reduced-dimension matrix P, N being a positive integer, $x_r$ being the LBP feature vector of the target image, and $x_r^T$ being a transposed vector of $x_r$;
    for $x_r$, calculating $X_p = P x_r$;
    performing latent Dirichlet allocation (LDA) dimension reduction on $x_p$ to obtain a reduced-dimension matrix L; and
    calculating the high-dimensional feature vector of the target image $x = L x_p$.

14. The apparatus according to claim 9, wherein obtaining the training matrix further comprises:
    initializing the first covariance matrix $S_\mu$ of n face images of each person in the image library and the second covariance matrix $S_\varepsilon$ of images of different persons in the image library;
    calculating F and G: $F = S_\mu^{-1}$, $G = -(m S_\mu + S_\varepsilon)^{-1} S_\mu S_\varepsilon^{-1}$;
    calculating the mean value $\mu_i$ of Gaussian distribution of an $i^{th}$ person in the image library: $\mu_i = \Sigma_{i=1}^m S_\mu (F + mG) x_i$, and the joint distribution covariance matrix $\varepsilon_{ij}$ of the $i^{th}$ person and a $j^{th}$ person according to F and G: $\varepsilon_{ij} = x_j + \Sigma_{i=1}^m S_\varepsilon G x_i$, $x_i$ being a high-dimensional feature vector of the $i^{th}$ person, and $x_j$ being a high-dimensional feature vector of the $j^{th}$ person;
    updating $S_\mu$ and $S_\varepsilon$ according to the following formula:

$$S_\mu = \text{cov}(\mu) = m^{-1} \sum_i \mu_i \mu_i^T, \quad S_\varepsilon = \text{cov}(\varepsilon) = m^{-1} \sum_i \sum_j \varepsilon_{ij} \varepsilon_{ij}^T$$

wherein $\mu_i^T$ is a transposed vector of $\mu_i$, and $\varepsilon_{ij}^T$ is a transposed vector of $\varepsilon_{ij}$; and
    calculating the training matrixes $A = (S_\mu + S_\varepsilon)^{-1} - (F + G)$ and $G = -(m S_\mu + S_\varepsilon)^{-1} S_\mu S_\varepsilon^{-1}$ according to the updated $S_\mu$ and $S_\varepsilon$, F, and G.

15. The apparatus according to claim 14, wherein the operations further comprise:
    determining whether the updated $S_\mu$ and $S_\varepsilon$ are convergent; and
    if the updated $S_\mu$ and the updated $S_\varepsilon$ are not convergent, performing the step of calculating F and G again; or
    if the updated $S_\mu$ and the updated $S_\varepsilon$ are convergent, performing a step of calculating a training matrix according to F and G corresponding to the convergent $S_\mu$ and $S_\varepsilon$, and the convergent $S_\mu$ and $S_\varepsilon$.

16. The apparatus according to claim 9, wherein the obtaining a high-dimensional feature vector of each person corresponding to images in the image library comprises:
    extracting, for each face image in the image library, an LBP feature vector of the face image;
    calculating a mean value of all features in the LBP feature vector of the face image;
    subtracting the mean value from each feature in the LBP feature vector of the face image to obtain a feature vector $x_{ri} = \{x_{ri}, 0 < i < m*n\}$, wherein $x_{ri}$ represents an LBP feature vector of the face image after mean value processing;
    performing PCA dimension reduction on $x_r^T x_r$, and reserving features of the first N dimensions, to obtain a reduced-dimension matrix P, N being a positive integer, and $x_r^T$ being a transposed vector of $x_r$;
    for $x_r$, calculating $x_p = P x_r$;
    performing, for face images of each person, LDA dimension reduction on $x_p$ to obtain a reduced-dimension matrix L; and
    calculating the high-dimensional feature vector of each person: $x = L x_p$.

17. A non-transitory computer-readable storage medium, the storage medium storing program instructions, and when being executed by a processor of a computing device, the program instructions causing the processor to perform:

extracting a local binary pattern (LBP) feature vector of a target image, the target image being a face image;

calculating a high-dimensional feature vector of the target image according to the LBP feature vector;

obtaining a training matrix, the training matrix being a matrix obtained by training images in an image library by using a joint Bayesian algorithm, the image library comprising m*n face images, m being a number of persons corresponding to images in the image library, and n being a number of face images of each person; and performing image recognition on the target image according to the high-dimensional feature vector of the target image and the training matrix, wherein obtaining the training matrix comprises:

obtaining a high-dimensional feature vector of each person corresponding to the face images in the image library;

initializing a first covariance matrix of n face images of each person in the image library and a second covariance matrix of images of different persons in the image library, the first covariance matrix being an m-dimensional square matrix and the second covariance matrix being an m*n square matrix;

calculating a mean value of Gaussian distribution of each person in the image library;

calculating a joint distribution covariance matrix of two persons in the image library according to the first covariance matrix, the second covariance matrix, and the high-dimensional feature vectors of the two persons;

updating the first covariance matrix according to the mean value of Gaussian distribution, and updating the second covariance matrix according to the joint distribution covariance matrix; and     obtaining the training matrix based on the updated first covariance matrix and the updated second covariance matrix.

\* \* \* \* \*